(12) United States Patent
Barak

(10) Patent No.: US 6,229,648 B1
(45) Date of Patent: *May 8, 2001

(54) COMPACT PROJECTOR

(75) Inventor: Shlomo Barak, Rishon le Zion (IL)

(73) Assignee: Unic View Ltd., Netanya (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/056,107

(22) Filed: Apr. 6, 1998

(51) Int. Cl.[7] ........................................ G02B 5/30
(52) U.S. Cl. ......................... 359/494; 359/465; 353/20; 353/34
(58) Field of Search .................... 359/465, 494; 353/20, 38, 122, 34

(56) References Cited

U.S. PATENT DOCUMENTS

| 5,590,942 | * | 1/1997 | Kimura et al. | 353/34 |
| 5,777,789 | * | 7/1998 | Chiu et al. | 359/494 |
| 5,884,991 | * | 3/1999 | Levis et al. | 353/122 |

* cited by examiner

Primary Examiner—Cassandra Spyrou
Assistant Examiner—Craig Curtis
(74) Attorney, Agent, or Firm—Abelman, Frayne & Schwab

(57) ABSTRACT

A projector including a non-polarized light source, at least one polarizing beam-splitter receiving light from the non-polarized light source, the polarizing beam splitter including first and second prisms separated by a liquid crystal material, a selectably actuable polarization rotating light valve having impinging thereon light from the polarizing beam splitter and operating in a reflective mode, and a mirror having impinging thereon light from the polarizing beam splitter and reflecting the light via the polarizing beam splitter to the light source.

21 Claims, 18 Drawing Sheets

COMPACT PROJECTOR

FIELD OF THE INVENTION

The present invention relates to projectors generally and more particularly to video and data projectors.

BACKGROUND OF THE INVENTION

Various types of video and computer generated information projectors are known. These include, for example, the SharpVision product line commercially available from Sharp Corporation of Japan. Conventional projectors of this type have achieved significant market penetration but suffer from various disadvantages and limitations.

One of the significant limitations in liquid crystal panel projectors lies in the relatively limited amount of light that can be projected. It may be appreciated that the amount of light that can be transmitted through a conventional color liquid crystal panel assembly is limited by the amount of light that can be absorbed by the liquid crystal panel without degradation of its performance and permanent damage thereto inter alia mainly due to overheating. Accordingly the brightness of projected images produced by such projectors is correspondingly limited.

SUMMARY OF THE INVENTION

The present invention seeks to provide an improved projector which is highly efficient in light utilization.

There is thus provided in accordance with a preferred embodiment of the present invention a projector including a non-polarized light source, at least one polarizing beam-splitter receiving light from the non-polarized light source, a selectably actuable polarization rotating light valve having impinging thereon light from the polarizing beam splitter and operating in a reflective mode, and a mirror having impinging thereon light from the polarizing beam splitter and reflecting the light via the polarizing beam splitter to the light source.

Preferably the color modulator is associated with the light source.

Further in accordance with a preferred embodiment of the present invention the at least one polarizing beam-splitter directs light of a first polarity to the selectably actuable polarization rotating light valve and directs light of a second polarity to the mirror, the mirror reflects the light of the second polarity to the polarizing beam-splitter which directs it back to the light source, and the light source at least partially depolarizes said light of the second polarity.

Still further in accordance with a preferred embodiment of the present invention the polarizing beam-splitter transmits light of a first polarity to the selectably actuable polarization rotating light valve and reflects light of a second polarity to the mirror and the polarizing beam-splitter reflects light from the mirror to the light source.

Moreover in accordance with a preferred embodiment of the present invention the polarizing beam-splitter reflects light of a first polarity to said selectably actuable polarization rotating light valve and reflects light of a second polarity to said mirror and said polarizing beam-splitter reflects light from said mirror to said light source.

Additionally in accordance with a preferred embodiment of the present invention the polarizing beam-splitter reflects light of a first polarity to the selectably actuable polarization rotating light valve and transmits light of a second polarity to the mirror and the polarizing beam-splitter transmits light from the mirror to the light source.

Further in accordance with a preferred embodiment of the present invention the selectably actuable polarization rotating light valve includes a total internal reflection color splitter/combiner associated with red, green and blue light valves.

Alternatively the selectably actuable polarization rotating light valve comprises a color splitter/combiner associated with red, green and blue light valves.

Additionally in accordance with a preferred embodiment of the present invention the selectably actuable polarization rotating light valve comprises a total internal reflection color splitter/combiner associated with red, green and blue light valves.

Further in accordance with a preferred embodiment of the present invention the selectably actuable polarization rotating light valve comprises a color splitter/combiner associated with red, green and blue light valves.

Still further in accordance with a preferred embodiment of the present invention includes a phase volume grating associated with the light source, and a microlens array associated with the selectably actuable polarization rotating light valve.

Moreover in accordance with a preferred embodiment of the present invention includes a holographic microlens array associated with the light source.

There is also provided in accordance with a preferred embodiment of the present invention a non-polarized light source, at least one polarizing beam-splitter receiving light from the non-polarized light source, at least one selectably actuable polarization rotating light valve having impinging thereon light from the polarizing beam splitter and operating in a reflective mode, and a color modulator associated with the light source.

There is further provided in accordance with a preferred embodiment of the present invention a projector including a non-polarized light source; at least one polarizing beam-splitter receiving light from the non-polarized light source, at least one selectably actuable polarization rotating light valve having impinging thereon light from the polarizing beam splitter and operating in a reflective mode, a phase volume grating associated with said light source, and a microlens array associated with the selectably actuable polarization rotating light valve.

There is yet further provided in accordance with a preferred embodiment of the present invention a projector including a non-polarized light source, at least one polarizing beam-splitter receiving light from the non-polarized light source, at least one selectably actuable polarization rotating light valve having impinging thereon light from the polarizing beam splitter and operating in a reflective mode, and a holographic microlens array associated with said light source.

There is also provided in accordance with a preferred embodiment of the present invention a projector including a non-polarized light source, at least one polarizing beam-splitter receiving light from the non-polarized light source, at least one selectably actuable polarization rotating light valve having impinging thereon light from the polarizing beam splitter and operating in a reflective mode, and a color modulator associated with the light valve.

The present invention, a preferred embodiment of which is described hereinabove, has a number of advantages over the prior art:

It utilizes both polarized components of the light from the light source as well as the full spectrum of the light. Thus, the percentage of the light emitted by the light source that is outputted exceeds that conventionally realized in the prior art.

The use of reflective light valves provides greater efficiency than would be achieved using transmissive light valves since it avoids the obscuration produced by the black matrix of the transistors used therein and shortens the optical path. Also, the utilization of a polarizing beam splitter obviates the need for polarizers usually associated with a liquid crystal light valve.

Operation in a reflective mode enables the beam splitters to be used as beam combiners, thus reducing the number of components and the overall size and weight of the display.

A first light valve may be operative to modulate an image intended for a viewer's left eye, while a second light valve may be operative to modulate an image intended for a viewer's right eye, or vice versa.

A combined image projected via an objective lens appears on a suitable polarization retaining screen as two mutually orthogonally polarized images. A viewer, wearing glasses having left and right lenses having mutually orthogonal polarization, sees a resulting image, in three dimensions, as if it were coming out of the screen.

In an alternative embodiment of the invention wherein time-interlaced stereo projection is provided, the glasses may contain time-interlaced shutters for enabling different eyes of the viewer to see different images.

There is also provided in accordance with a preferred embodiment of the present invention a projector including a non-polarized light source, at least one polarizing beam-splitter receiving light from the non-polarized light source and first and second selectably actuable polarization rotating light valves having impinging thereon light from the polarizing beam splitter and operating in a reflective mode, wherein the first light valve is operative to modulate a first image portion and said second light valve is operative to modulate a second image portion interlaced with the first image portion.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
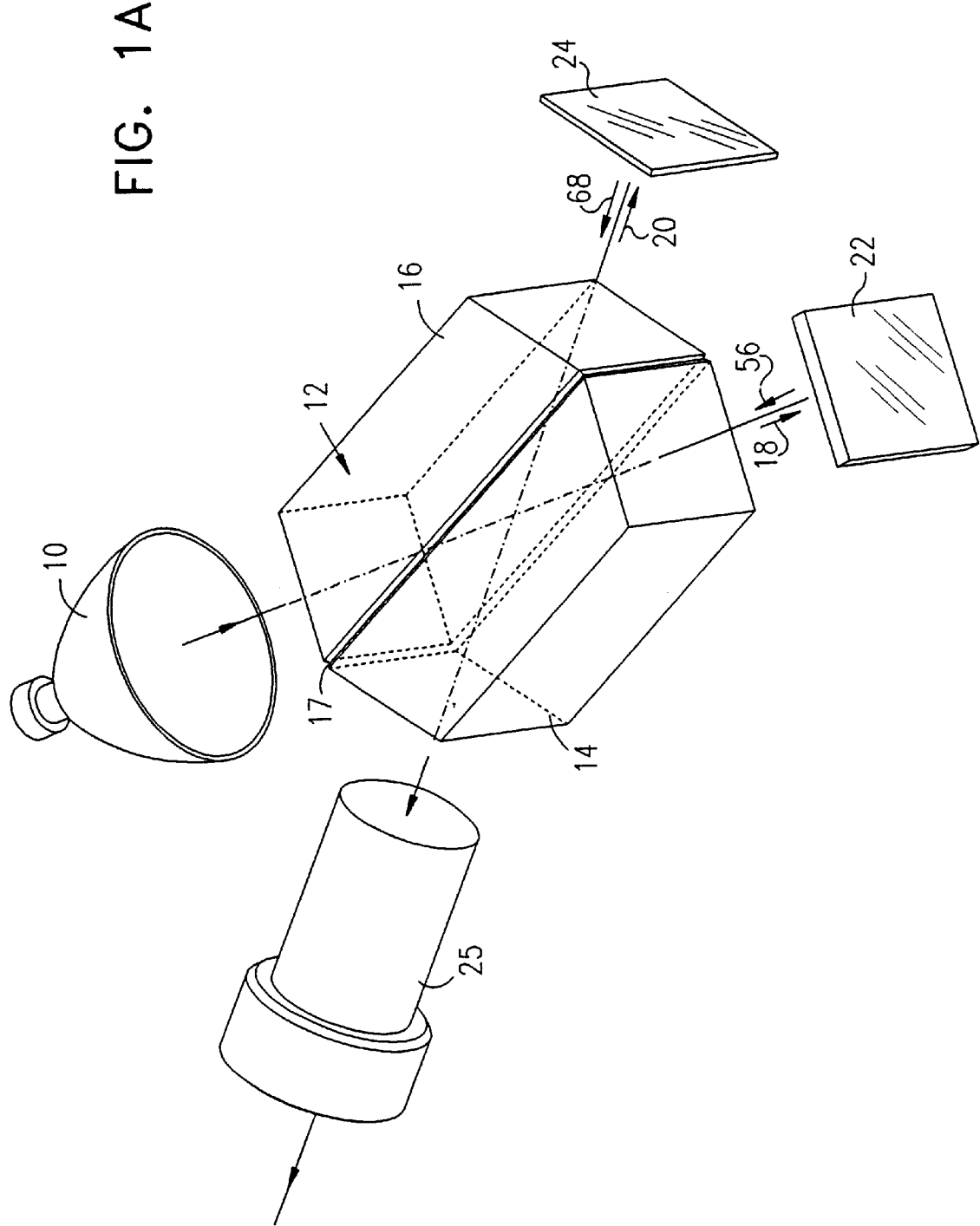
FIGS. 1A and 1B are simplified schematic illustrations of two alternative embodiments of a projector constructed and operative in accordance with one preferred embodiment of the present invention.

Reference is now made to FIG. 1A, which is a simplified schematic illustration of a projector constructed and operative in accordance with a preferred embodiment of the present invention. The projector preferably comprises a non-polarized light source 10, such as an arc lamp based illuminator, which directs a beam of light onto a polarizing beam splitter/combiner 12.

Preferably, the polarizing beam splitter/combiner 12 comprises first and second prisms 14 and 16 separated by a liquid crystal material 17. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 12 is operative to split the light impinging thereon from light source 10 into two preferably differently polarized beams, 18 and 20. In accordance with a preferred embodiment of the present invention, beam 18, which is transmitted by liquid crystal material 17, impinges on a selectably actuable polarization rotating light valve 22 operating in a reflective mode. An example of a suitable light valve is a conventional reflective LCD without a polarizer. Further in accordance with this preferred embodiment of the invention, beam 20, which is reflected by the liquid crystal material 17, impinges on a mirror 24.

The selectably actuable polarization rotating light valve 22 thus receives light of a first polarity from the polarizing beam splitter 12, while the mirror 24 receives light of a second polarity, typically, but not necessarily, orthogonal to said first polarity, from the polarizing beam splitter 12.

In accordance with a preferred embodiment of the present invention modulated light reflected from the selectably actuable light valve 22 is reflected by the beam splitter 12 to an objective lens 25 which outputs the modulated light beam in a projection mode.

It is a particular feature of the present invention that light of a second polarity is reflected by mirror 24 back to the beam splitter 12 which reflects it back to the light source 10, which is operative to at least partially depolarize such light, converting at least part of it to light of a first polarity, which is then modulated by light valve 22 and output via objective lens 25.

The depolarization of the light of the second polarity has the advantages of providing significantly higher light efficiency while providing corresponding lower heating of the projector from absorbed light.

Figure 1B:
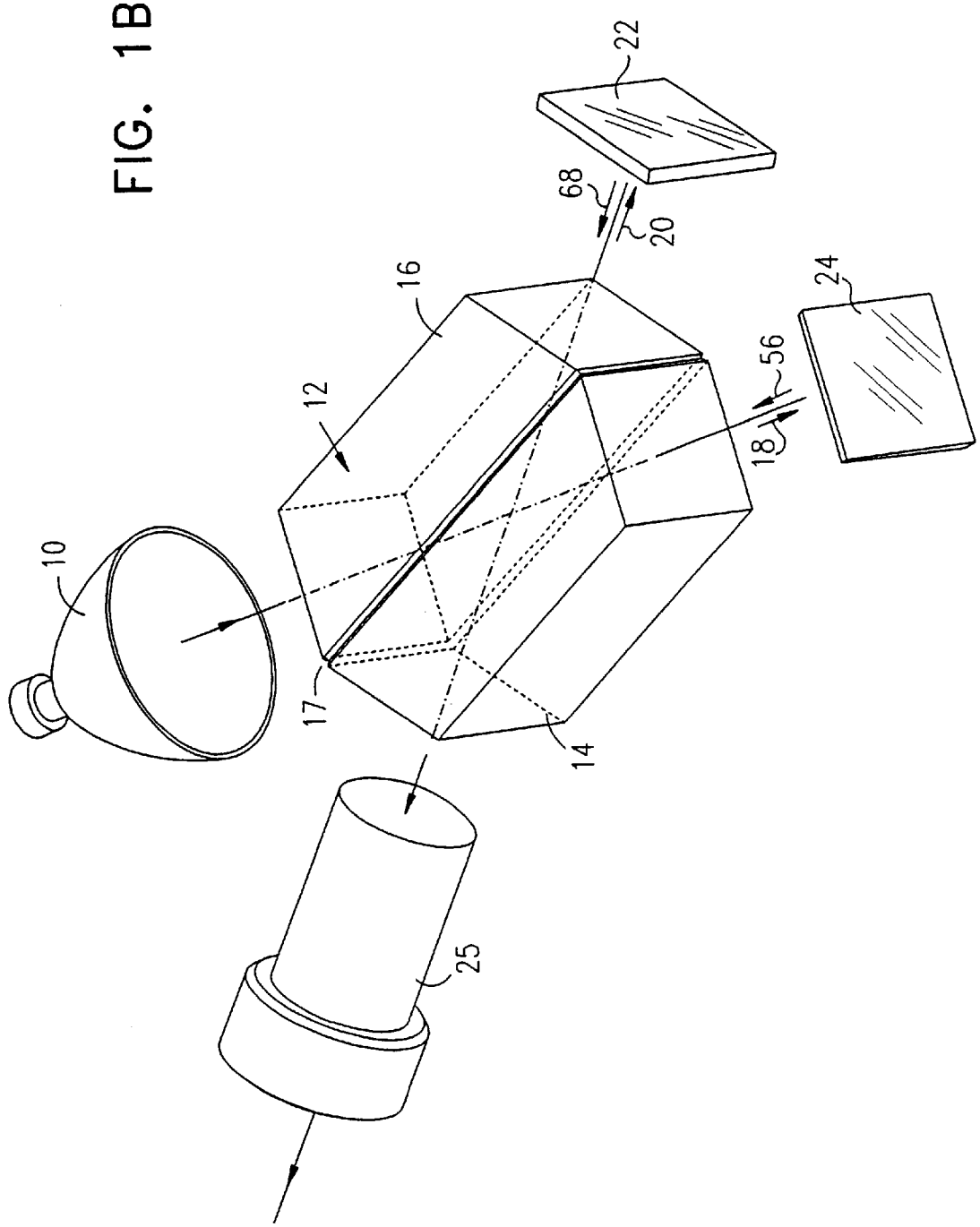

Reference is now made to FIG. 1B, which illustrates a variation of the structure shown in FIG. 1A in which the positions of the light valve 22 and of the mirror 24 are reversed. Normally, the embodiment of FIG. 1A is preferred, however the embodiment of FIG. 1B is clearly within the scope of the present invention.

Figure 2A:
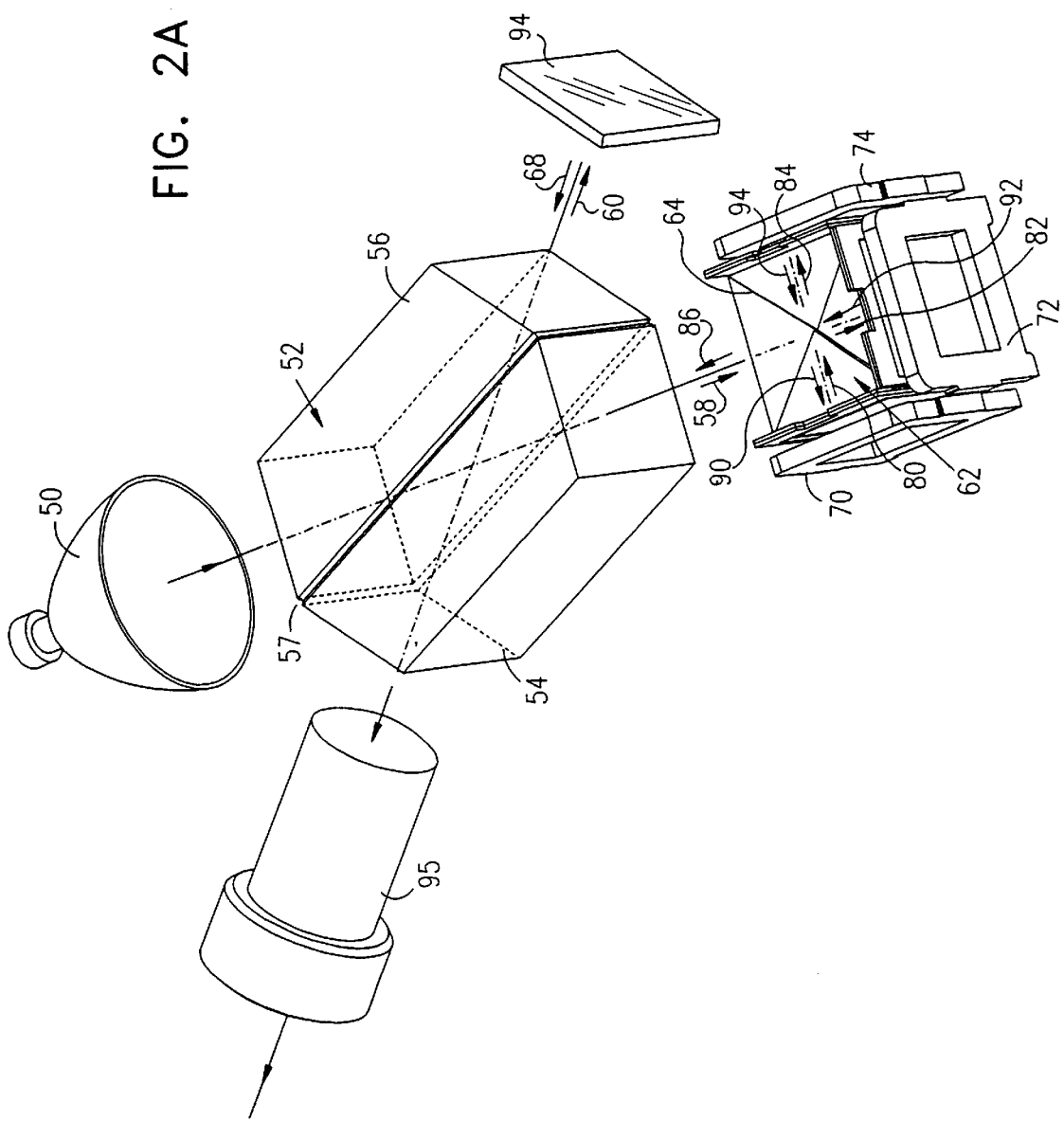
FIGS. 2A and 2B are simplified schematic illustrations of two alternative embodiments of a projector constructed and operative in accordance with another preferred embodiment of the present invention employing light valves incorporating a color splitter/combiner.

Reference is now made to FIG. 2A, which is a simplified schematic illustration of a projector constructed and operative in accordance with another preferred embodiment of the present invention. The projector preferably comprises a non-polarized light source 50, such as an arc lamp based illuminator, which directs a beam of light onto a polarizing beam splitter/combiner 52.

Preferably, the polarizing beam splitter/combiner 52 comprises first and second prisms 54 and 56, separated by a liquid crystal material 57. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 52 is operative to split the light impinging thereon from light source 50 into two preferably differently polarized beams, 58 and 60. In accordance with a preferred embodiment of the present invention, beam 58, which is transmitted by liquid crystal material 57, impinges on a selectably actuable polarization rotating light valve 62 operating in a reflective mode.

In this embodiment, the selectably actuable polarization rotating light valve 62 preferably includes a conventional color splitter 64, which is commercially available from C. V. I. Laser Corporation of Albuquerque, N.M. U.S.A.

In accordance with a preferred embodiment of the present invention, there are provided first, second and third reflective light valves 70, 72 and 74 operatively associated with the color splitter 64 for modulating respective R, G and B components of light of a first polarity.

Light valves 70, 72 and 74 are commercially available from S-Vision Inc. of Santa Clara, Calif., U.S.A. It is appreciated that color splitter 64 operates not only as a color splitters but also as a color combiner.

It may be appreciated that the color splitter 64 is operative to spectrally split beam 58 into R, G and B components, respectively indicated by arrows 80, 82 and 84. These components impinge on respective reflective light valves 70, 72 and 74 which modulate the light impinging thereon and reflect the modulated light beams, respectively indicated by arrows 90, 92 and 94 back through the color splitter 64, which transmits a combined beam, indicated by arrow 86, back to polarizing beam splitter/combiner 52.

It is to be noted that throughout the description and claims, that the designations first, second, third, etc. and the reference numerals assigned to the light valves are arbitrary and are for the purposes of illustration only. They are not intended to be limiting or to identify a given polarity or color with a given position or orientation of a light valve.

Further in accordance with this preferred embodiment of the invention, beam 60, which is reflected by the liquid crystal material 57, impinges on a mirror 94.

As in the embodiment of FIG. 1A, the selectably actuable polarization rotating light valve 62 thus receives light of a first polarity from the polarizing beam splitter 52, while the mirror 94 receives light of a second polarity, typically, but not necessarily, orthogonal to said first polarity, from the polarizing beam splitter 52.

In accordance with a preferred embodiment of the present invention modulated light reflected from the selectably actuable light valve 62 is reflected by the beam splitter 52 to an objective lens 95 which outputs the modulated light beam in a projection mode.

As in the embodiment of FIG. 1A, light of a second polarity is reflected by mirror 94 back to the beam splitter 52 which reflects it back to the light source 50, which is operative to at least partially depolarize such light, converting at least part of it to light of a first polarity, which is then modulated by light valve 62 and output via objective lens 95.

Figure 2B:
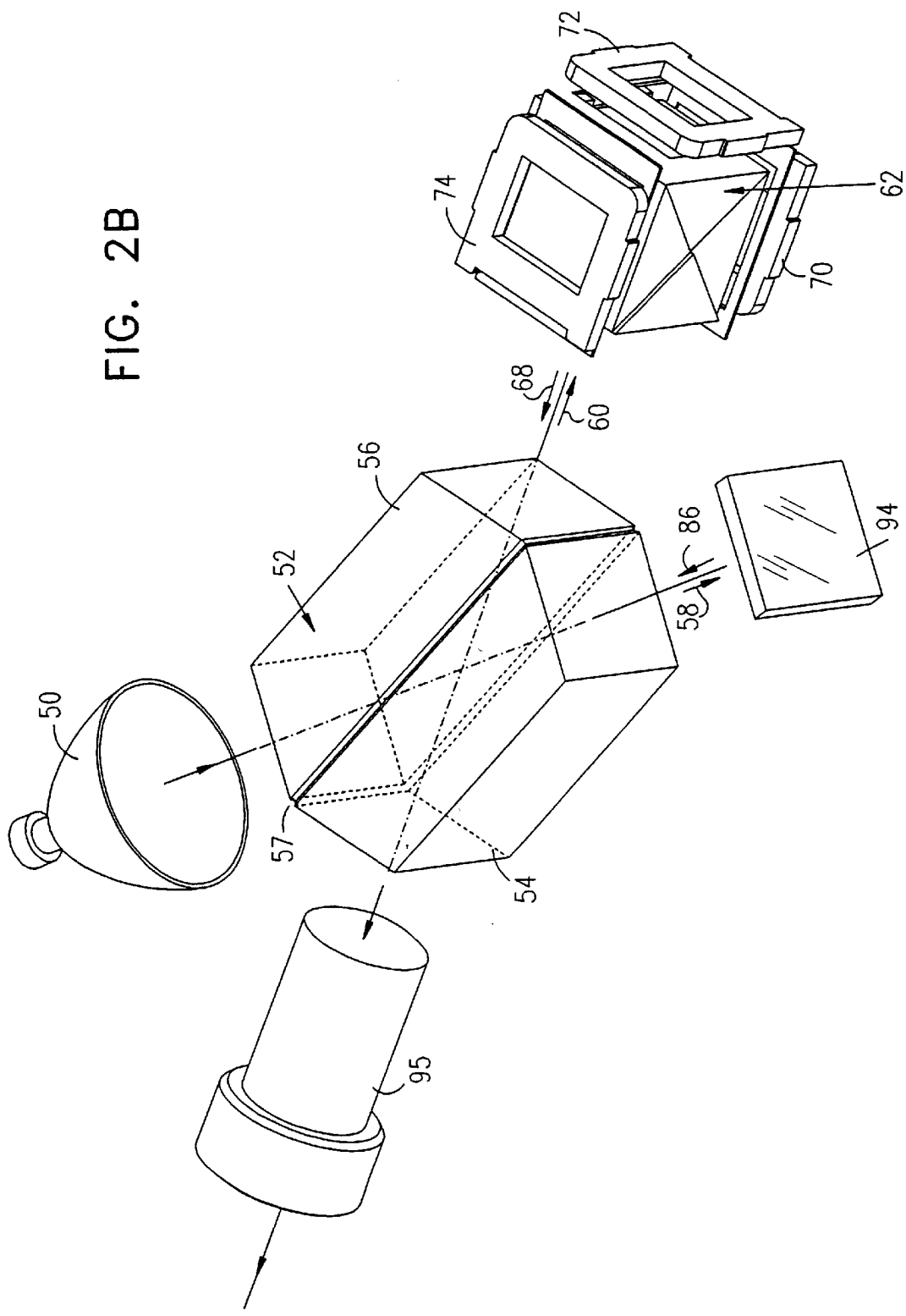

Reference is now made to FIG. 2B, which illustrates a variation of the structure shown in FIG. 2A in which the positions of the light valve 62 and of the mirror 94 are reversed. Normally, the embodiment of FIG. 2A is preferred, however the embodiment of FIG. 2B is clearly within the scope of the present invention.

Figure 3A:
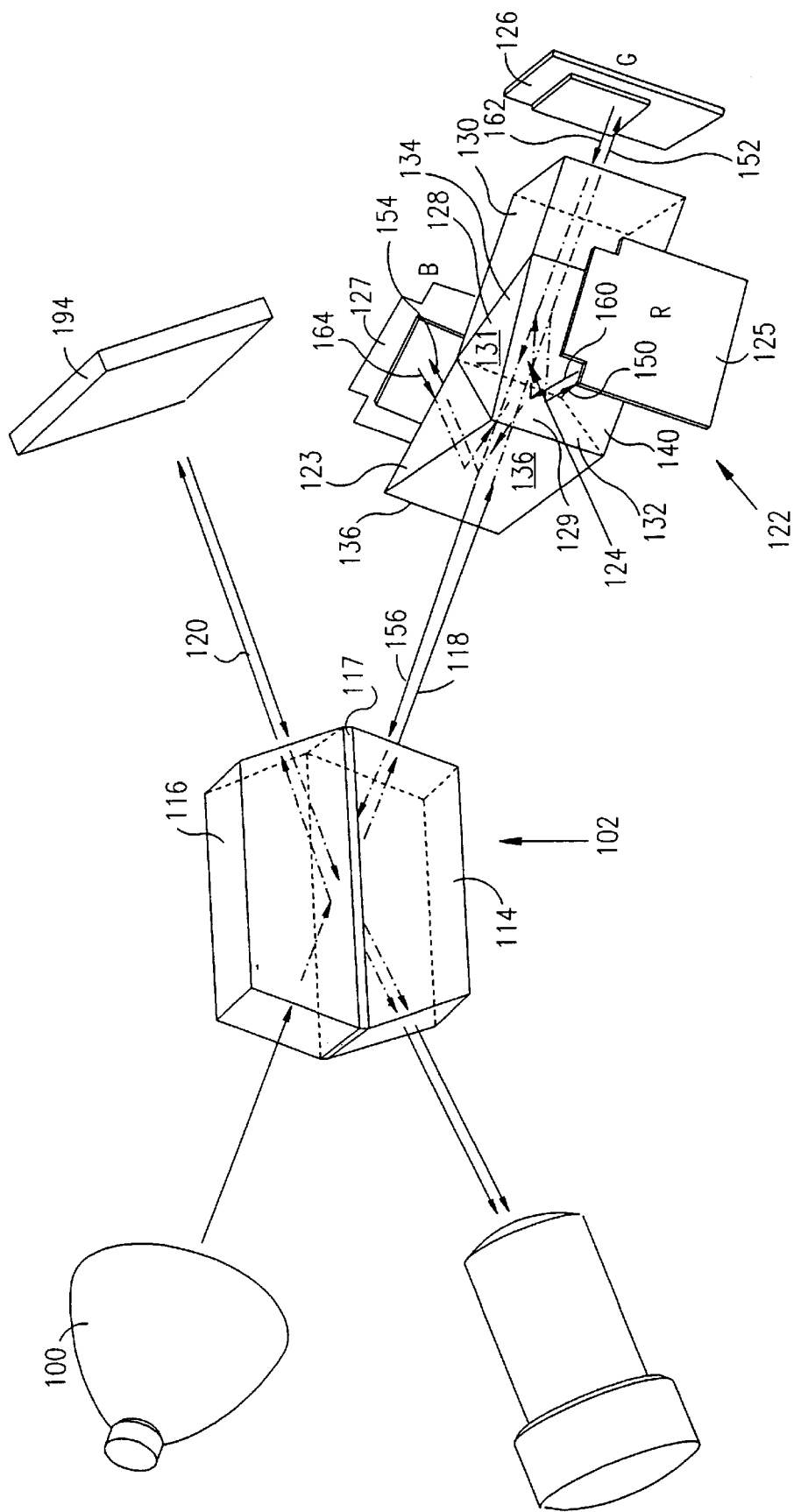
FIGS. 3A and 3B are simplified schematic illustrations of two alternative embodiments of a projector constructed and operative in accordance with yet another preferred embodiment of the present invention employing light valves incorporating a total internal reflection color splitter/combiner.

Reference is now made to FIG. 3A, which is a simplified schematic illustration of a projector constructed and operative in accordance with yet another preferred embodiment of the present invention. The projector preferably comprises a non-polarized light source 100, such as an arc lamp based illuminator, which directs a beam of light onto a polarizing beam splitter/combiner 102.

Preferably, the polarizing beam splitter/combiner 102 comprises first and second prisms 114 and 116 separated by a liquid crystal material 117. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 102 is operative to split the light impinging thereon from light source 100 into two preferably differently polarized beams, 118 and 120. Beam 118 impinges on a selectably actuable polarization rotating light valve 122, preferably comprising a total internal reflection color splitter/combiner 124 associated with red, green and blue light valves, 125, 126 and 127 respectively. Color splitter/combiner 124 preferably comprises a total internal reflection dichroic RGB separator/combiner.

Preferably, the total internal reflection dichroic RGB separator/combiner 124 preferably comprises first, second and third glass prisms 123, 128 and 130 which are preferably configured such that the light paths extending therethrough for the R, G and B components are all preferably equal in length.

Prisms 123, 128 and 130 are commercially available in a block from Continental Optical corporation of Hauppauge, N.Y. Preferably an air gap (not shown) is maintained between prisms 123 and 128, while no air gap need be maintained between prisms 128 and 130.

Disposed intermediate prisms 123 and 128, on a surface 129 of prism 123, is a dichroic multilayer layer coating 132 which is operative to separate the B component from the R and G components. Disposed intermediate prisms 128 and 130, on a surface 131 of prism 128, is a dichroic multilayer layer coating 134 which is operative to separate the R and G components from one another.

Light, such as beam 118, which impinges on a surface 136 of prism 123, as seen in FIG. 3A, is separated by coating 132 into a B component, which is reflected toward surface 136 of prism 123 and is totally internally reflected thereat, and R and G components which traverse the coating. The B component exits prism 123 and impinges on a light valve 127, such as a liquid crystal light valve operative in a reflective mode.

The R and G components impinge on a surface 131 of prism 128, on which is formed coating 134. These two components are separated by coating 134 into a R component, which is reflected toward surface 140 of prism 128 and is totally internally reflected thereat, and a G component which traverses the coating. The R component exits prism 128 and impinges on a light valve 125, such as a liquid crystal light valve operative in a reflective mode.

The G component passes through prism 130 and impinges on a light valve 126, such as a liquid crystal light valve operative in a reflective mode.

The total internal reflection dichroic RGB separator/combiner 124 thus receives light of a first polarity from the polarizing beam splitter 102, while a mirror 194 receives beam 120, being light of a second polarity, typically, but not necessarily, orthogonal to said first polarity, from the polarizing beam splitter 102.

The light valves employed in the embodiment of FIG. 3A are commercially available from S-Vision Inc. of Santa Clara, Calif., U.S.A.

It is appreciated that the total internal reflection dichroic RGB separator/combiner 124 operates not only as a color splitter but also as a color combiner.

As may be appreciated from a consideration of FIGS. 3A, total internal reflection dichroic RGB separator/combiner 124 is operative to spectrally split beam 118 into R, G and B components, respectively indicated by arrows 150, 152 and 154. These components impinge on respective reflective light valves 125, 126 and 127, which modulate the light impinging thereon and reflect the modulated light beams, respectively indicated by arrows 160, 162 and 164 back through the total internal reflection dichroic RGB separator/combiner 124, which combines the modulated components and transmit a combined beam, indicated by arrow 156, back to polarizing beam splitter/combiner 102.

The polarizing beam splitter/combiner 102 directs beam 156 to an objective lens 170, which outputs the combined modulated light beams.

The embodiment of FIG. 3A, which is described hereinabove, has a number of advantages over the embodiment of FIG. 1A:

The total internal reflection dichroic RGB separator/combiner employing prisms 123, 128 and 130, as shown in FIG. 3A is not sensitive to the polarity of the R,G,B components of light passing therethrough.

Therefore the contrast and efficiency provided by the total internal reflection dichroic RGB separator/combiner is not affected.

Figure 3B:
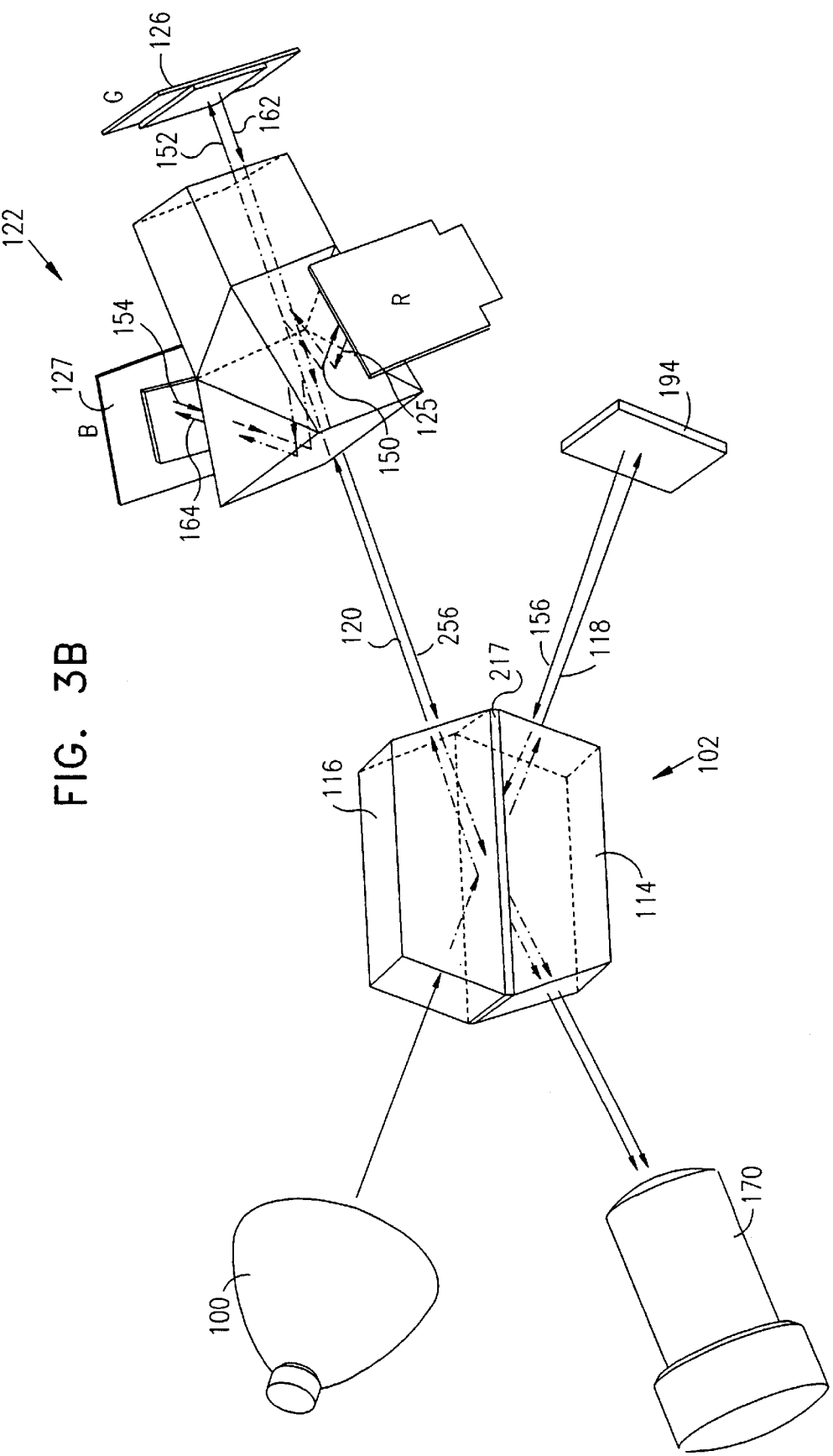

Reference is now made to FIG. 3B, which illustrates a variation of the structure shown in FIG. 3A in which the positions of the light valve 122 and of the mirror 194 are reversed. Normally, the embodiment of FIG. 3A is preferred, however the embodiment of FIG. 3B is clearly within the scope of the present invention.

Figure 4A:
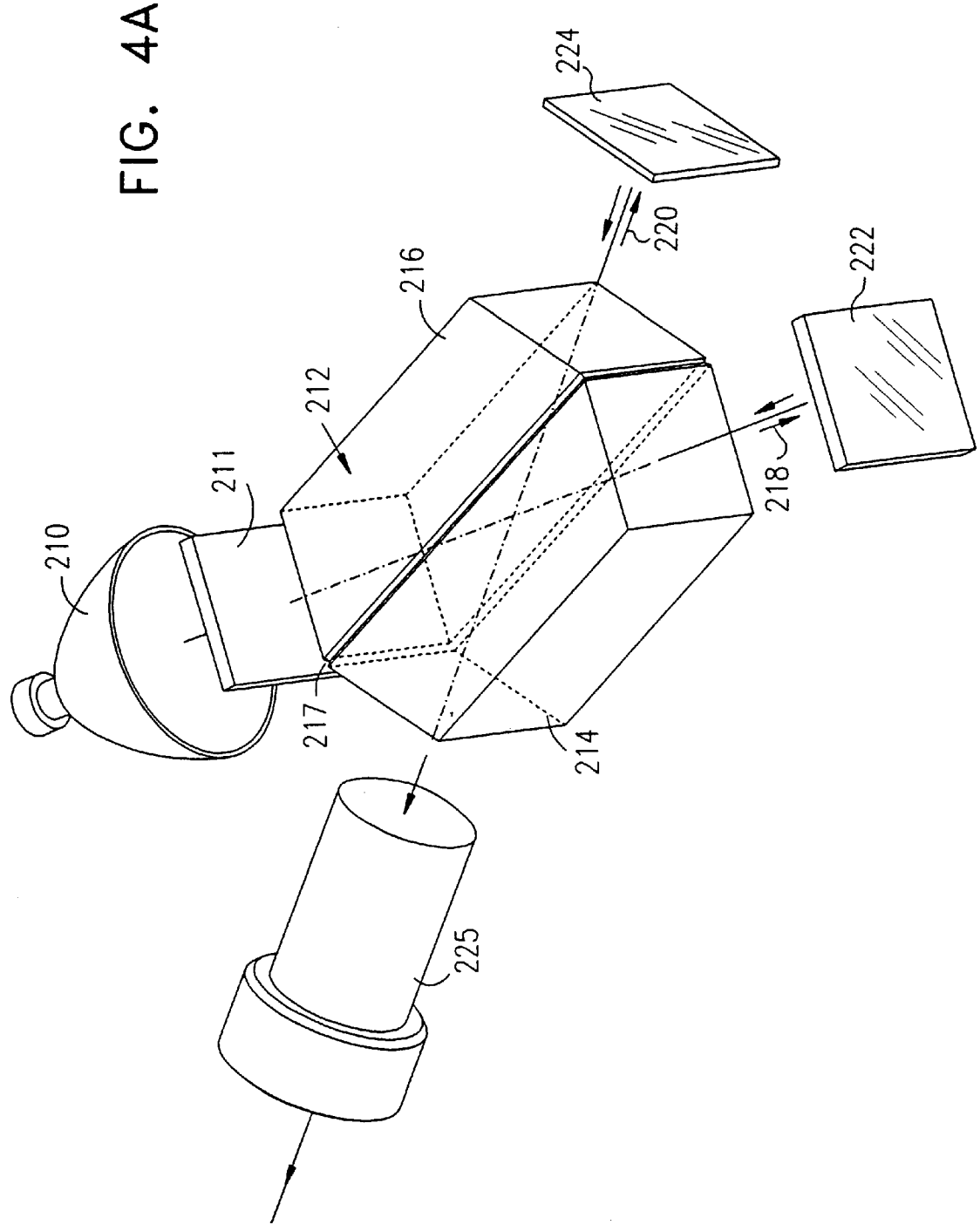
FIGS. 4A, 4B and 4C are simplified schematic illustrations of three alternative embodiments of a projector constructed and operative in accordance with yet another preferred embodiment of the present invention employing a color modulator associated with a light source.

Reference is now made to FIG. 4A, which is a simplified schematic illustration of a projector constructed and operative in accordance with a preferred embodiment of the present invention. The projector preferably comprises a non-polarized light source 210, such as an arc lamp based illuminator, which directs a beam of light via a color modulator 211, onto a polarizing beam splitter/combiner 212. The color modulator 211 may be any suitable color modulator, such as a color wheel.

Preferably, the polarizing beam splitter/combiner 212 comprises first and second prisms 214 and 216 separated by a liquid crystal material 217. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 212 is operative to split the light impinging thereon from light source 210 into two preferably differently polarized beams, 218 and 220. In accordance with preferred embodiment of the present invention, beam 218, which is transmitted by liquid crystal material 217, impinges on a selectably actuable polarization rotating light valve 222 operating in a reflective mode. An example of a suitable light valve is a conventional reflective LCD without a polarizer. Further in accordance with this preferred embodiment of the invention, beam 220, which is reflected by the liquid crystal material 217, impinges on a mirror 224. It is a particular feature of this embodiment that a color LCD is not required in order to provide color projection.

The selectably actuable polarization rotating light valve 222 thus receives light of a first polarity from the polarizing beam splitter 212, while the mirror 224 receives light of a second polarity, typically, but not necessarily, orthogonal to said first polarity, from the polarizing beam splitter 212.

In accordance with a preferred embodiment of the present invention modulated light reflected from the selectably actuable light valve 222 is reflected by the beam splitter 212 to an objective lens 225 which outputs the modulated light beam in a projection mode.

It is a particular feature of the present invention that light of a second polarity is reflected by mirror 224 back to the beam splitter 212 which reflects it back to the light source 210, which is operative to at least partially depolarize such light, converting at least part of it to light of a first polarity, which is then modulated by light valve 222 and output via objective lens 225.

The depolarization of the light of the second polarity has the advantages of providing significantly higher light efficiency while providing corresponding lower heating of the projector from absorbed light.

Figure 4B:
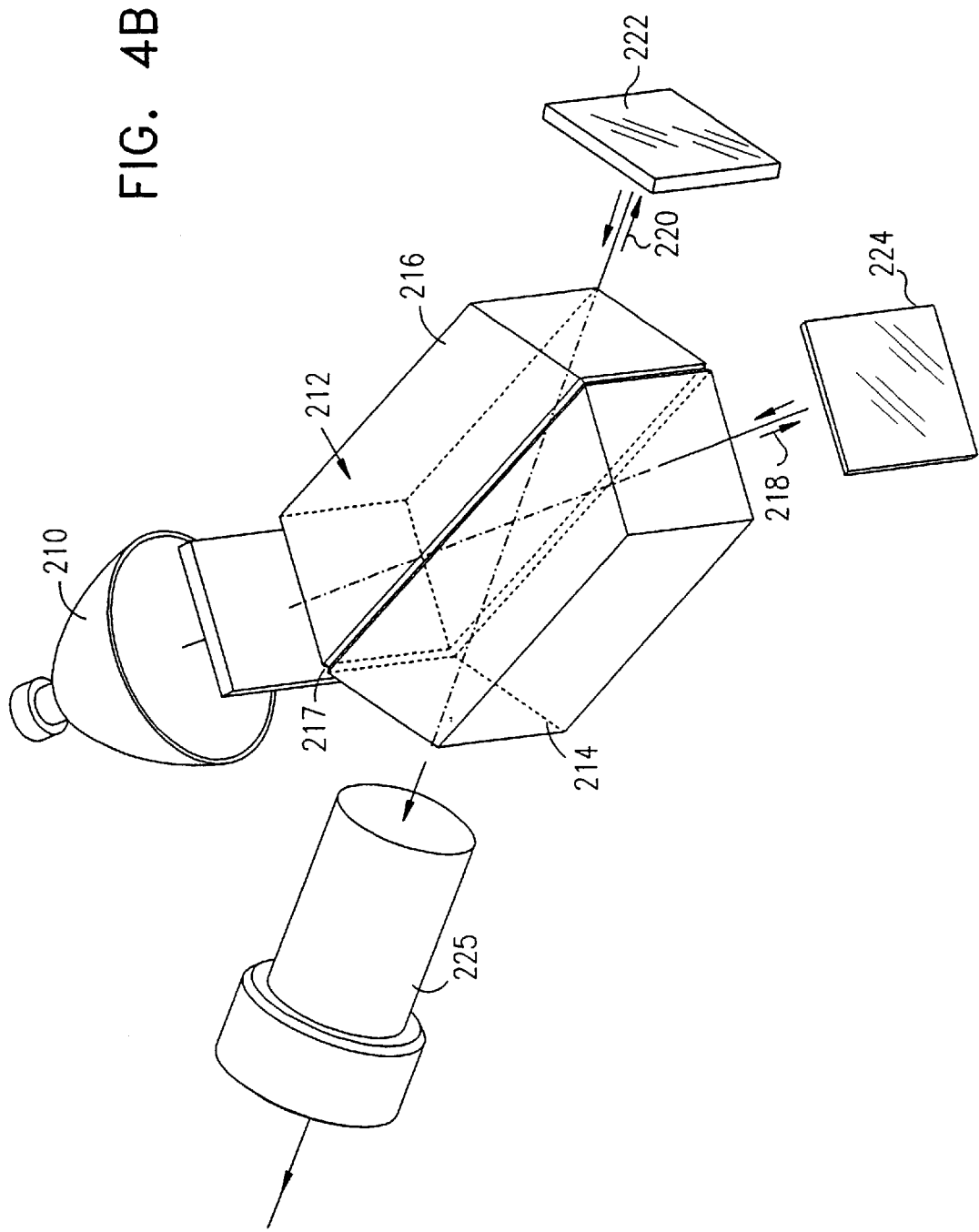

Reference is now made to FIG. 4B, which illustrates a variation of the structure shown in FIG. 4A in which the positions of the light valve 222 and of the mirror 224 are reversed. Normally, the embodiment of FIG. 4A is preferred, however the embodiment of FIG. 4B is clearly within the scope of the present invention.

Figure 4C:
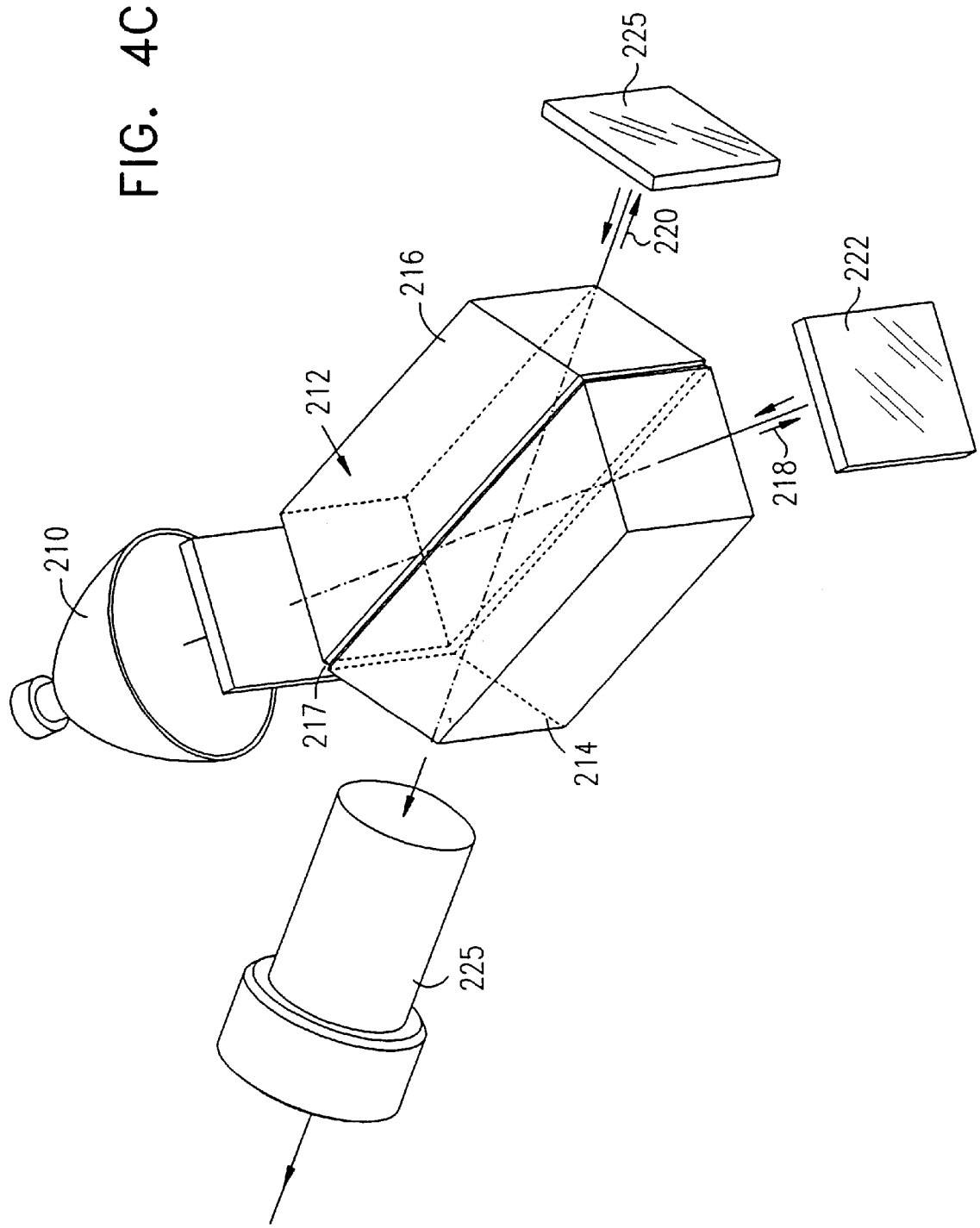

Reference is now made to FIG. 4C, which illustrates a further variation of the structure shown in FIG. 4A in which mirror 224 is replaced by a second light valve 225.

Figure 5A:
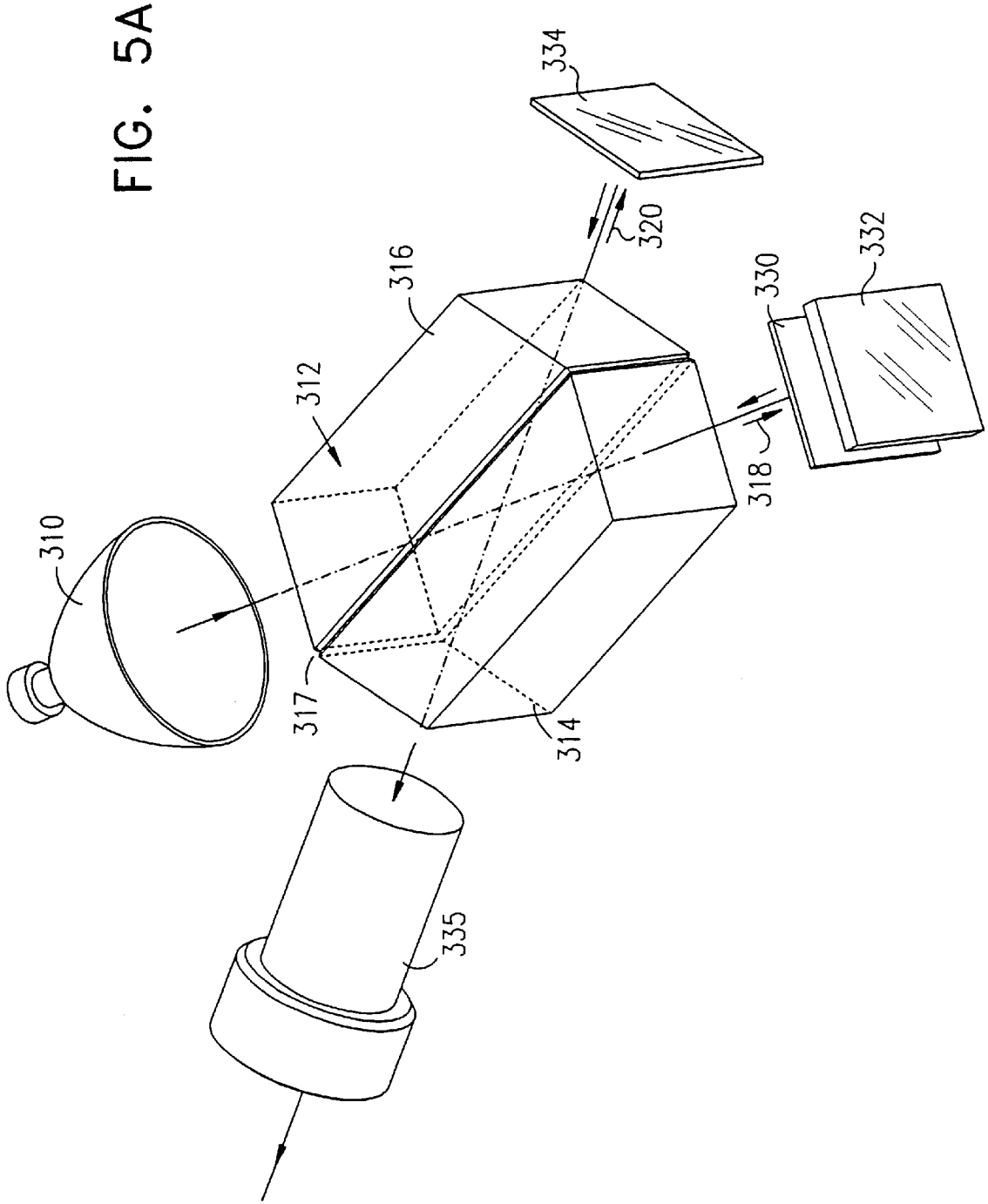
FIGS. 5A, 5B and 5C are simplified schematic illustrations of three alternative embodiments of a projector constructed and operative in accordance with yet another preferred embodiment of the present invention employing a color modulator associated with a light valve.

Reference is now made to FIG. 5A, which is a simplified schematic illustration of a projector constructed and operative in accordance with a preferred embodiment of the present invention. The projector preferably comprises a non-polarized light source 310, such as an arc lamp based illuminator, which directs a beam of light onto a polarizing beam splitter/combiner 312.

Preferably, the polarizing beam splitter/combiner 312 comprises first and second prisms 314 and 316 separated by a liquid crystal material 317. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 312 is operative to split the light impinging thereon from light source 310 into two preferably differently polarized beams, 318 and 320. In accordance with a preferred embodiment of the present invention, beam 318, which is transmitted by liquid crystal material 317, passes through a color modulator 330 and then impinges on a selectably actuable polarization rotating light valve 332 operating in a reflective mode.

A preferred color modulator 330 is a ferroelectric cell. Alternatively any other suitable color modulator may be employed An example of a suitable light valve is a conventional reflective LCD without a polarizer. Further in accordance with this preferred embodiment of the invention, beam 320, which is reflected by the liquid crystal material 317, impinges on a mirror 334. It is a particular feature of this embodiment that a color LCD is not required in order to provide color projection.

The selectably actuable polarization rotating light valve 332 thus receives light of a first polarity from the polarizing beam splitter 312, while the mirror 334 receives light of a second polarity, typically, but not necessarily, orthogonal to said first polarity, from the polarizing beam splitter 312.

In accordance with a preferred embodiment of the present invention modulated light reflected from the selectably actuable light valve 332 is reflected by the beam splitter 312 to an objective lens 335 which outputs the modulated light beam in a projection mode.

It is a particular feature of the present invention that light of a second polarity is reflected by mirror 334 back to the beam splitter 312 which reflects it back to the light source 310, which is operative to at least partially depolarize such light, converting at least part of it to light of a first polarity, which is then modulated by light valve 332 and output via objective lens 325.

The depolarization of the light of the second polarity has the advantages of providing significantly higher light efficiency while providing corresponding lower heating of the projector from absorbed light.

Figure 5B:
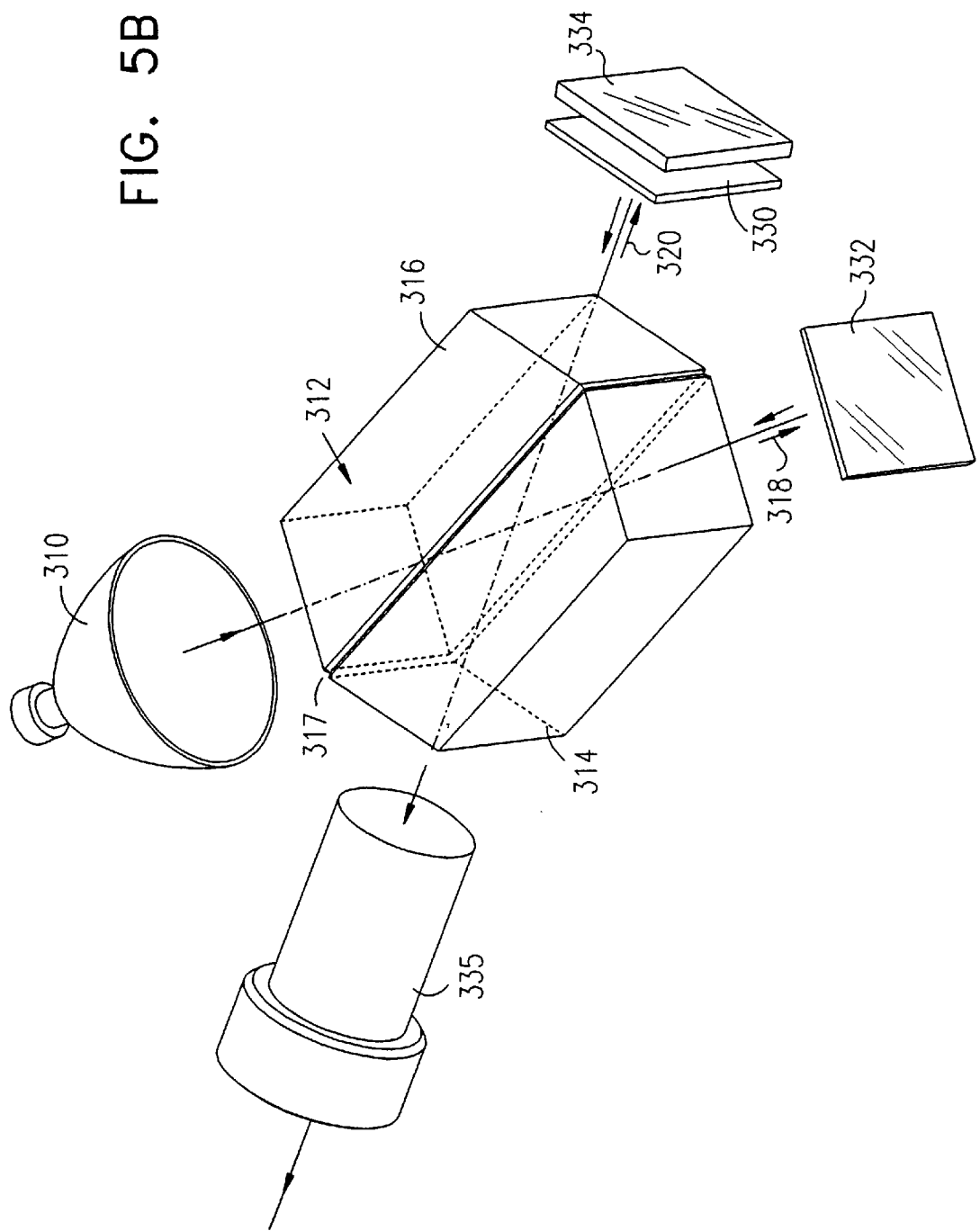

Reference is now made to FIG. 5B, which illustrates a variation of the structure shown in FIG. 5A in which the positions of the light valve 332 and color modulator 330, and of the mirror 334 are reversed. Normally, the embodiment of FIG. 5A is preferred, however the embodiment of FIG. 5B is clearly within the scope of the present invention.

Figure 5C:
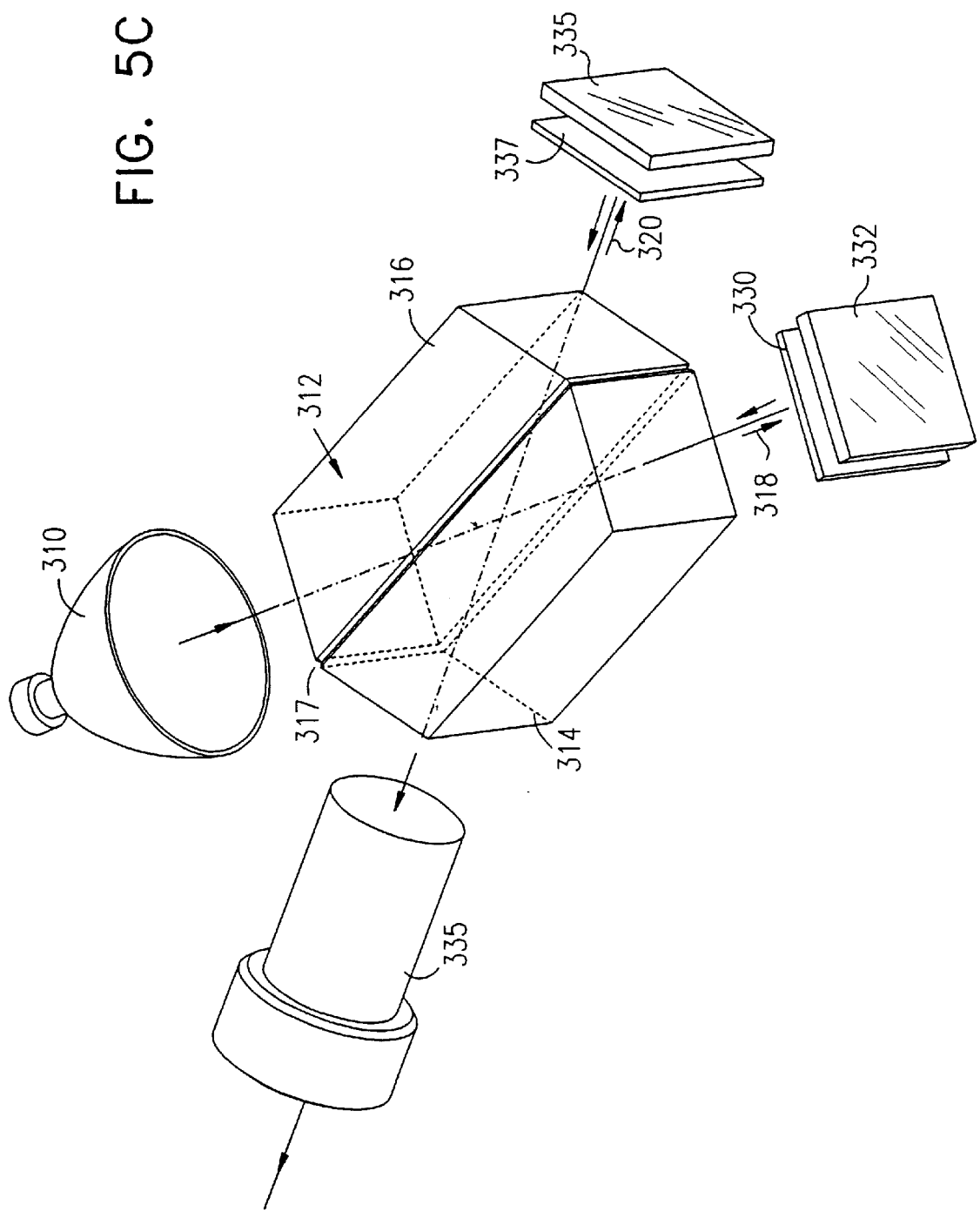

Reference is now made to FIG. 5C, which illustrates a further variation of the structure shown in FIG. 5A in which mirror 334 is replaced by a second light valve 335 and a second color modulator 337.

Figure 6A:
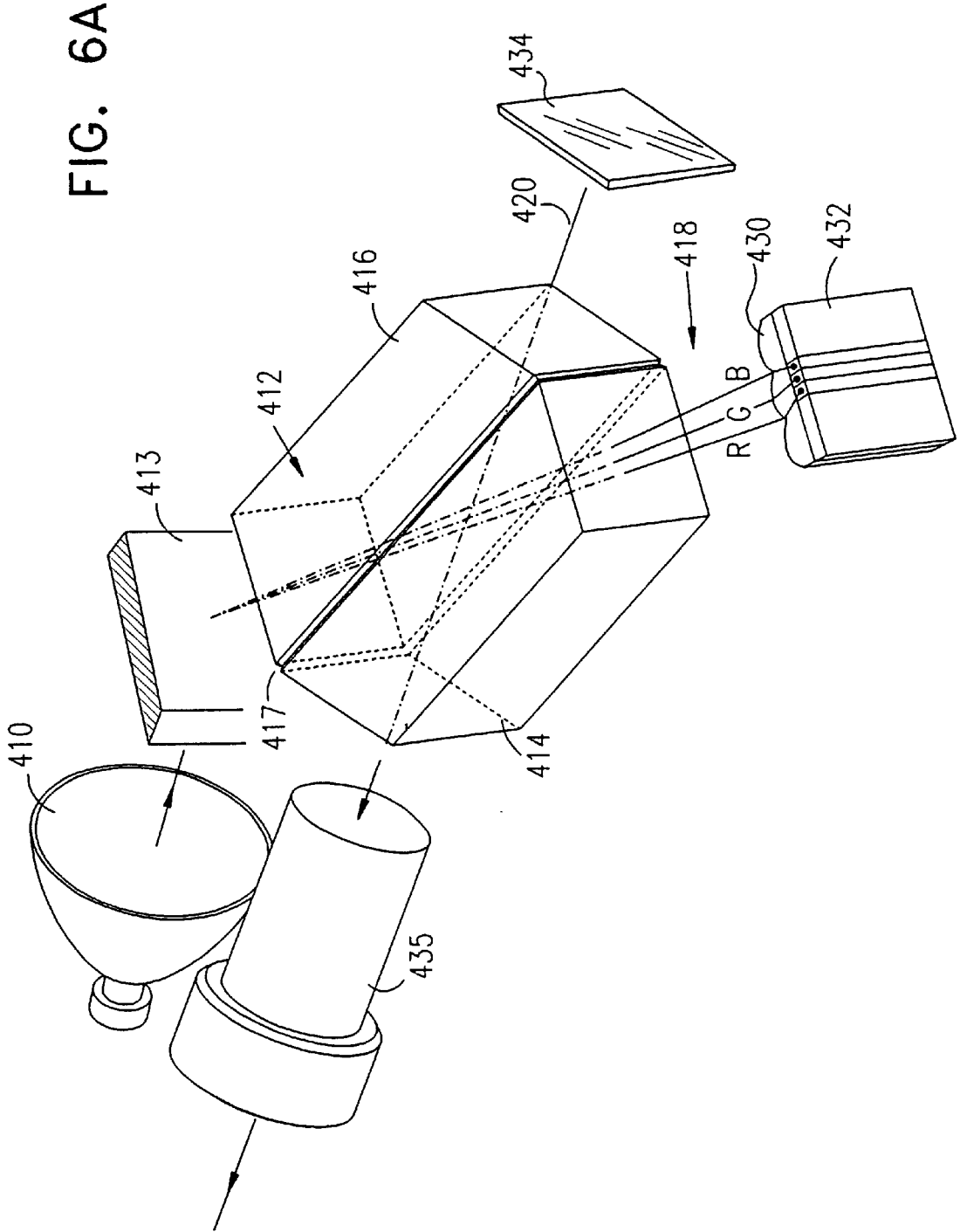
FIGS. 6A, 6B and 6C are simplified schematic illustrations of three alternative embodiments of a projector constructed and operative in accordance with yet another preferred embodiment of the present invention employing a phase volume grating associated with a light source and a microlens array associated with at least one light valve.

Reference is now made to FIG. 6A, which is a simplified schematic illustration of a projector constructed and operative in accordance with still another preferred embodiment of the present invention. The projector preferably comprises a non-polarized light source 410, such as an arc lamp based illuminator, which directs a beam of light onto a polarizing beam splitter/combiner 412 via a phase volume grating 413.

Phase volume grating 413 is a conventional grating which provides a continuous dispersion of the light spectrum. Its use is described in an article entitled Dispersive Holographic Microlens Matrix for Single LCD Projection by Cedile Joubert et al in Projection Displays II, Ming H. Wu, Ed, Proceedings of SPIE—The International Society for Optical Engineering 29–31, January, 1996, San Jose, Calif. SPIE Vol. 2650/243, the disclosure of which is hereby incorporated by reference.

Preferably, the polarizing beam splitter/combiner 412 comprises first and second prisms 414 and 416 separated by a liquid crystal material 417. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 412 is operative to split the light impinging thereon from light source 410 into two preferably differently polarized beams, 418 and 420. In accordance with a preferred embodiment of the present invention, beam 418, which is transmitted by liquid crystal material 417, passes through a microlens array 430 and then impinges on a selectably actuable polarization rotating light valve 432 operating in a reflective mode.

Microlens array 430 is a microlens array which provides RGB selective focusing of light onto the light valve 432. Its use is described in the aforesaid article entitled Dispersive Holographic Microlens Matrix for Single LCD Projection by Cedile Joubert et al in Projection Displays II, Ming H. Wu, Ed, Proceedings of SPIE—The International Society for Optical Engineering 29–31, January, 1996, San Jose, Calif. SPIE Vol. 2650/243, the disclosure of which is hereby incorporated by reference.

An example of a suitable light valve is a conventional reflective LCD without a polarizer. Further in accordance with this preferred embodiment of the invention, beam 420, which is reflected by the liquid crystal material 417, impinges on a mirror 434. It is a particular feature of this embodiment that a color LCD is not required in order to provide color projection.

The selectably actuable polarization rotating light valve 432 thus receives light of a first polarity from the polarizing beam splitter 412, while the mirror 434 receives light of a second polarity, typically, but not necessarily, orthogonal to said first polarity, from the polarizing beam splitter 412.

In accordance with a preferred embodiment of the present invention modulated light reflected from the selectably actuable light valve 432 is reflected by the beam splitter 412 to an objective lens 435 which outputs the modulated light beam in a projection mode.

It is a particular feature of the present invention that light of a second polarity is reflected by mirror 434 back to the beam splitter 412 which reflects it back to the light source 410, which is operative to at least partially depolarize such light, converting at least part of it to light of a first polarity, which is then modulated by light valve 432 and output via objective lens 435.

The depolarization of the light of the second polarity has the advantages of providing significantly higher light efficiency while providing corresponding lower heating of the projector from absorbed light.

Figure 6B:
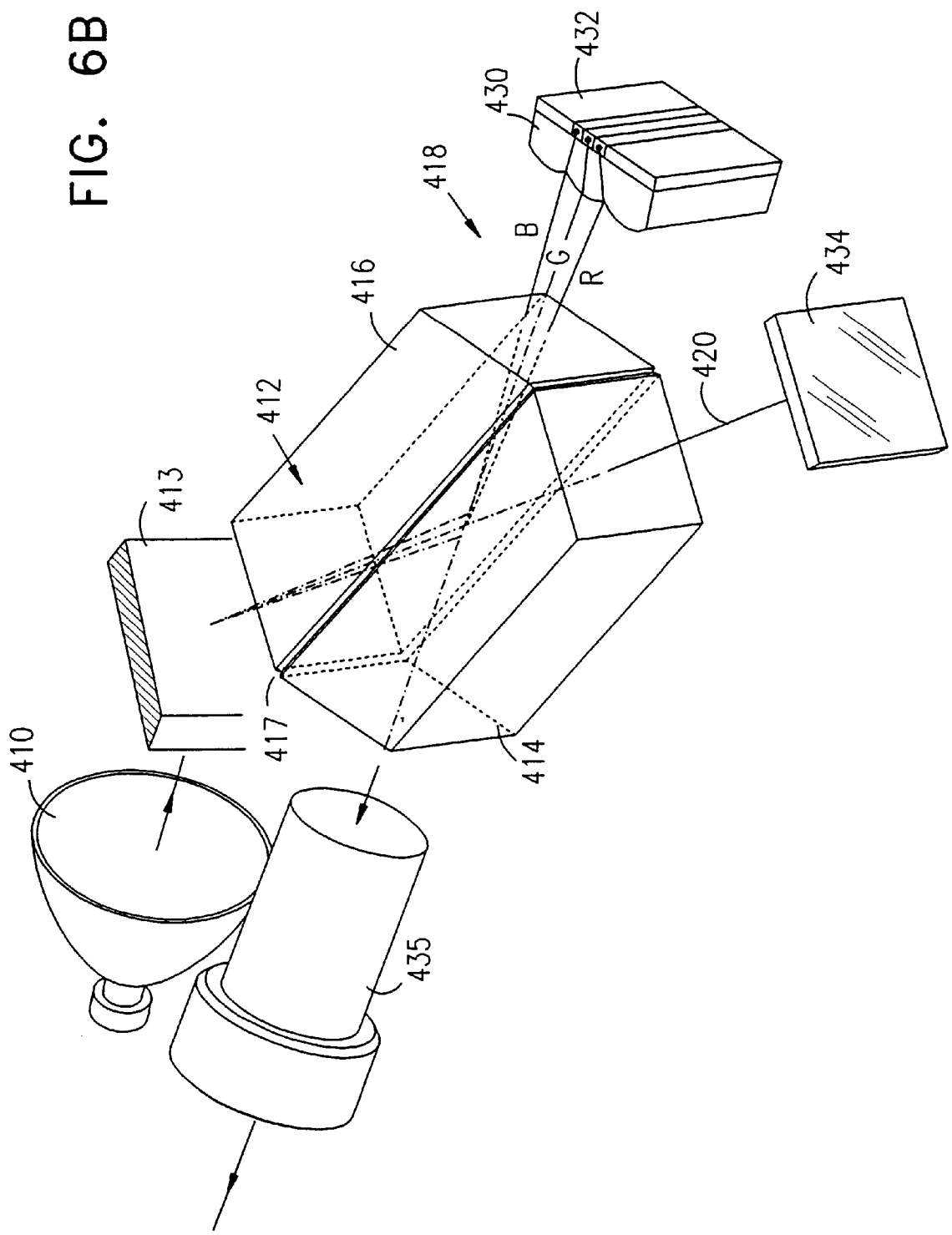

Reference is now made to FIG. 6B, which illustrates a variation of the structure shown in FIG. 6A in which the positions of the light valve 432 and of the mirror 434 are reversed. Normally, the embodiment of FIG. 6A is preferred, however the embodiment of FIG. 6B is clearly within the scope of the present invention.

Figure 6C:
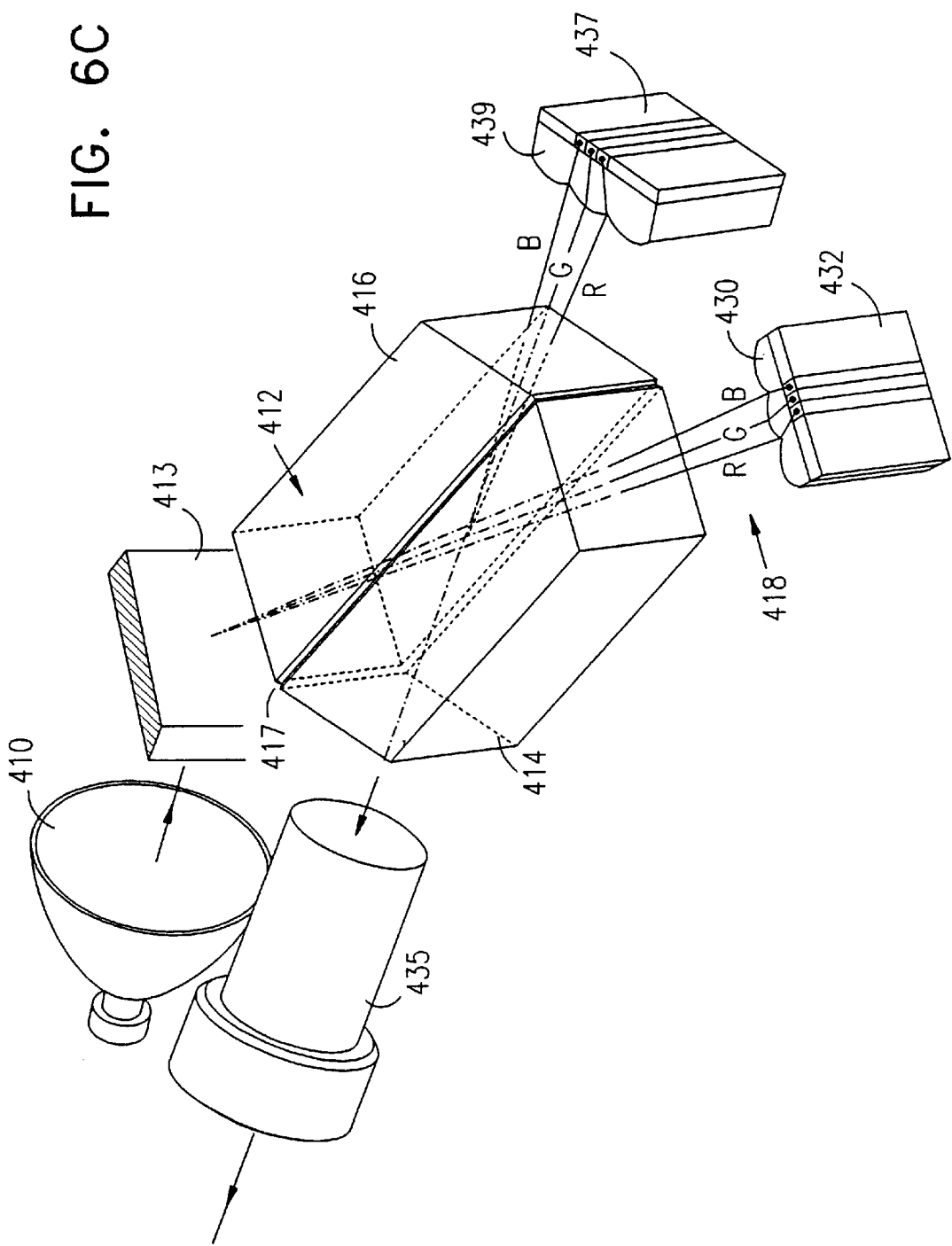

Reference is now made to FIG. 6C, which illustrates a further variation of the structure shown in FIG. 6A in which mirror 434 is replaced by a second light valve 437 and a second microlens 439.

Figure 7A:
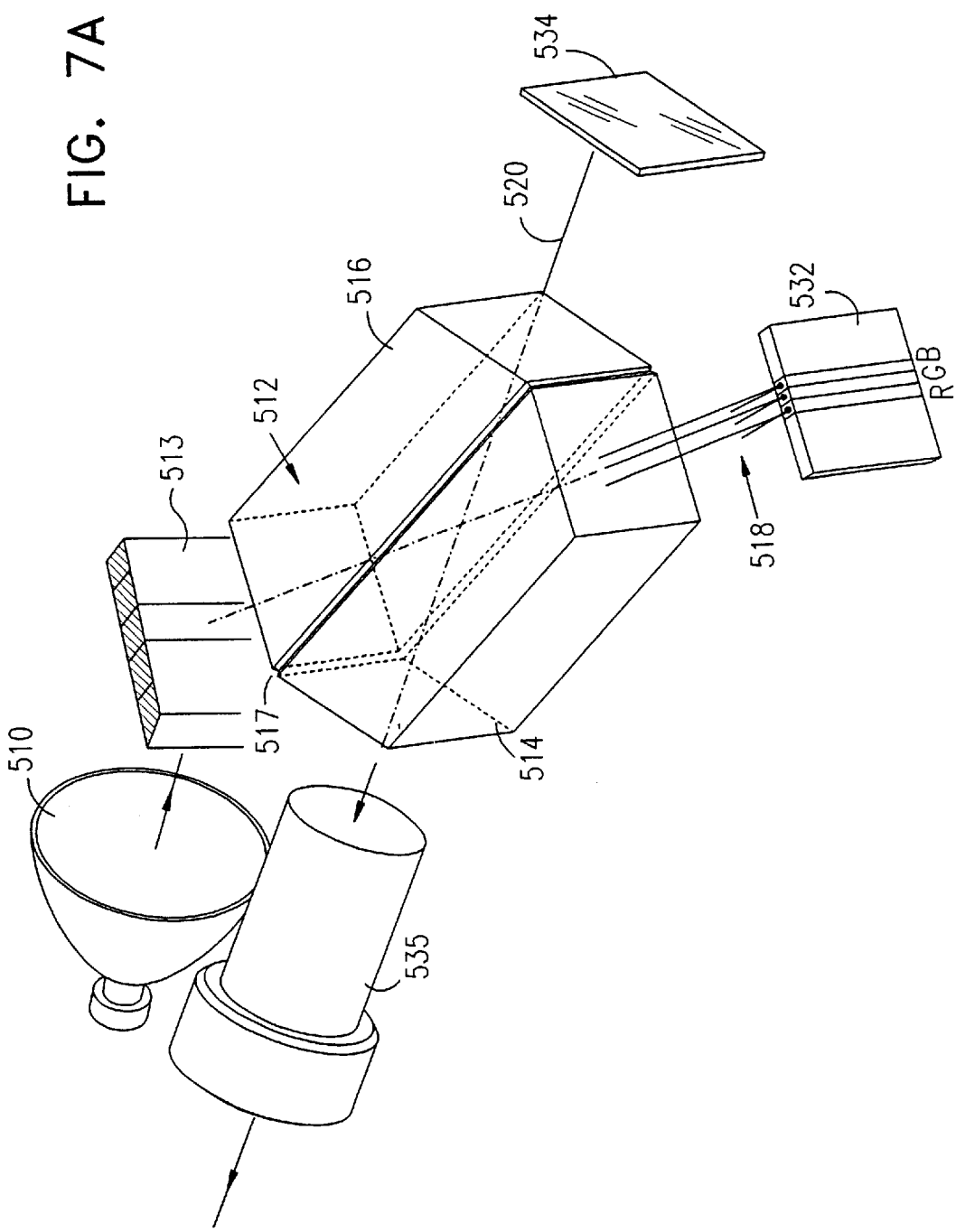
FIGS. 7A, 7B and 7C are simplified schematic illustrations of three alternative embodiments of a projector constructed and operative in accordance with yet another preferred embodiment of the present invention employing a holographic microlens array associated with a light source.

Reference is now made to FIG. 7A, which is a simplified schematic illustration of a projector constructed and operative in accordance with still another preferred embodiment of the present invention. The projector preferably comprises a non-polarized light source 510, such as an arc lamp based illuminator, which directs a beam of light onto a polarizing beam splitter/combiner 512 via a holographic microlens array 513.

Holographic microlens array 513 provides dispersion and RGB selective focusing via the polarizing beam splitter/combiner 512 onto a selectably actuable polarization rotating light valve 532 operating in a reflective mode.

The use of a holographic microlens array 513 is described in an article entitled Dispersive Holographic Microlens Matrix for Single LCD Projection by Cedile Joubert et al in Projection Displays II, Ming H. Wu, Ed, Proceedings of SPIE—The International Society for Optical Engineering 29–31, January, 1996, San Jose, Calif. SPIE Vol. 2650/243, the disclosure of which is hereby incorporated by reference.

Preferably, the polarizing beam splitter/combiner 512 comprises first and second prisms 514 and 516 separated by a liquid crystal material 517. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 512 is operative to split the light impinging thereon from light source 510 into two preferably differently polarized beams, 518 and 520. In accordance with a preferred embodiment of the present invention, beam 518, which is transmitted by liquid crystal material 517, impinges on selectably actuable polarization rotating light valve 532 operating in a reflective mode.

An example of a suitable light valve is a conventional reflective LCD without a polarizer. Further in accordance with this preferred embodiment of the invention, beam 520, which is reflected by the liquid crystal material 517, impinges on a mirror 534. It is a particular feature of this embodiment that a color LCD is not required in order to provide color projection.

The selectably actuable polarization rotating light valve 532 thus receives light of a first polarity from the polarizing beam splitter 512, while the mirror 534 receives light of a second polarity, typically, but not necessarily, orthogonal to said first polarity, from the polarizing beam splitter 512.

In accordance with a preferred embodiment of the present invention modulated light reflected from the selectably actuable light valve 532 is reflected by the beam splitter 512 to an objective lens 535 which outputs the modulated light beam in a projection mode.

It is a particular feature of the present invention that light of a second polarity is reflected by mirror 534 back to the beam splitter 512 which reflects it back to the light source 510, which is operative to at least partially depolarize such light, converting at least part of it to light of a first polarity, which is then modulated by light valve 532 and output via objective lens 535.

The depolarization of the light of the second polarity has the advantages of providing significantly higher light efficiency while providing corresponding lower heating of the projector from absorbed light.

Figure 7B:
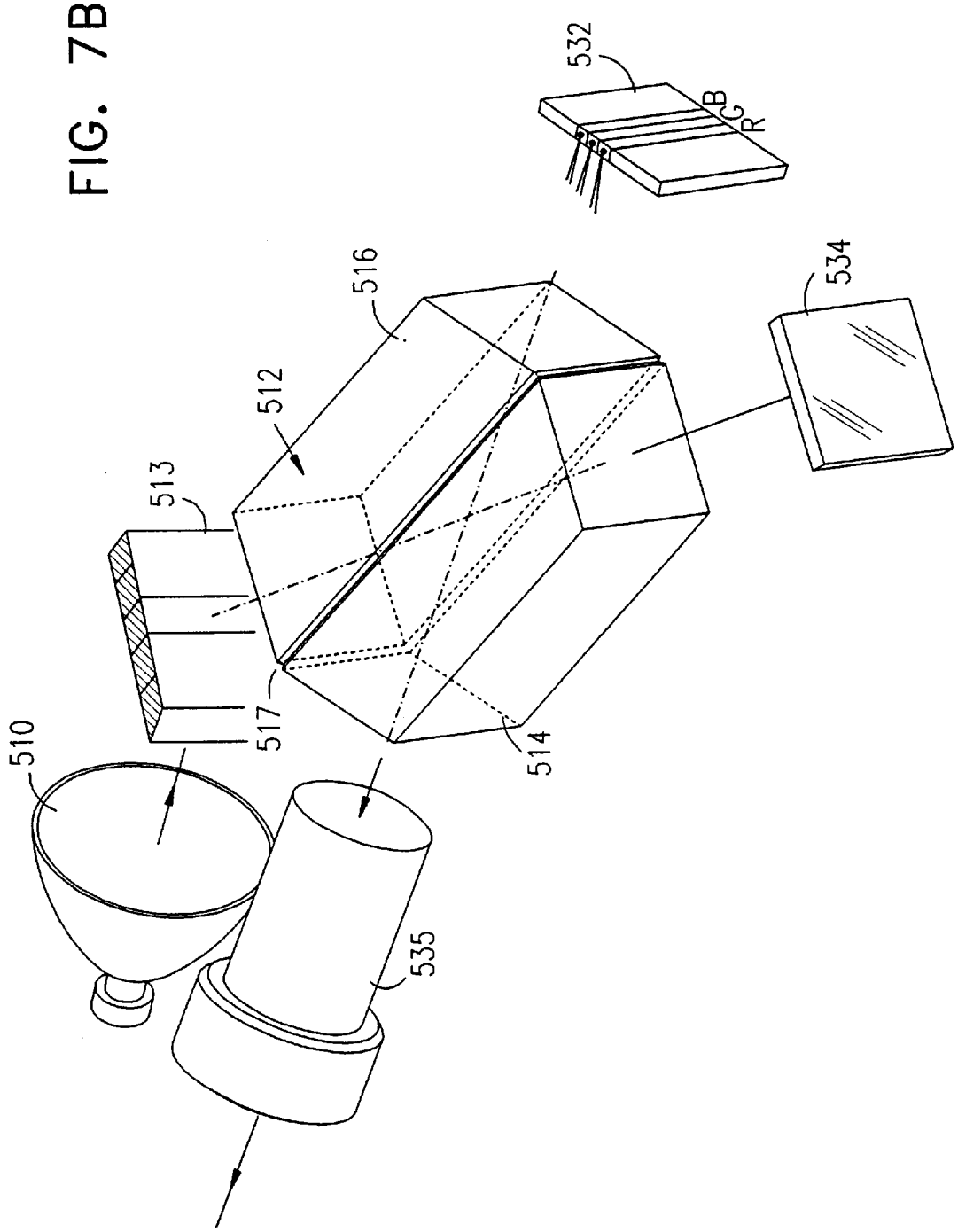

Reference is now made to FIG. 7B, which illustrates a variation of the structure shown in FIG. 7A in which the positions of the light valve 532 and of the mirror 534 are reversed. Normally, the embodiment of FIG. 7A is preferred, however the embodiment of FIG. 7B is clearly within the scope of the present invention.

Figure 7C:
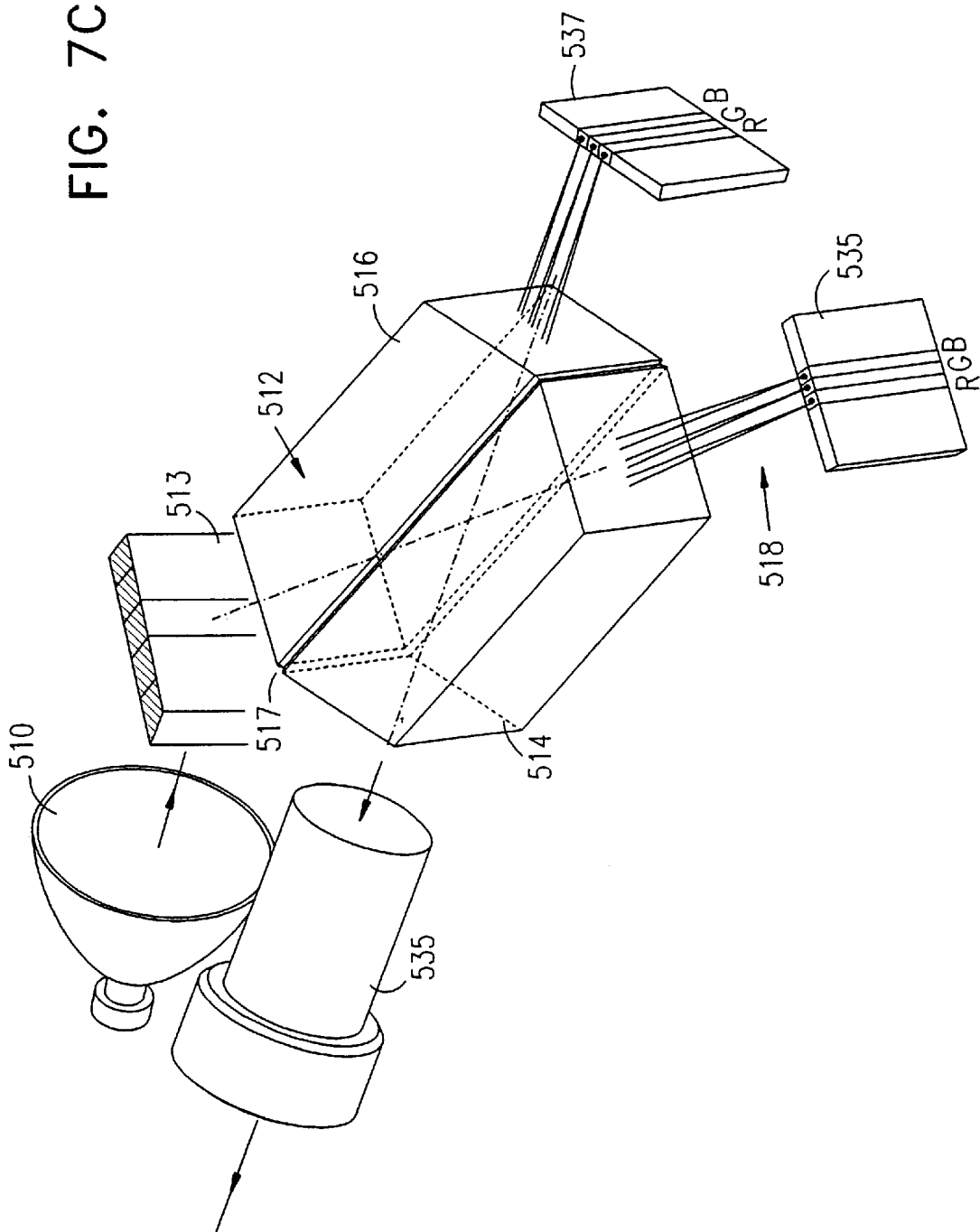

Reference is now made to FIG. 7C, which illustrates a further variation of the structure shown in FIG. 7A in which mirror 534 is replaced by a second light valve 537.

The present invention, a preferred embodiment of which is described hereinabove, has a number of advantages over the prior art:

It utilizes both polarized components of the light from the light source as well as generally the full spectrum of the light. Thus, the percentage of the light emitted by the light source that is outputted exceeds that conventionally realized in the prior art.

The use of reflective light valves provides greater efficiency than would be achieved using transmissive light valves since it avoids the obscuration produced by the black matrix of the transistors used therein and shortens the optical path. Also, the utilization of a polarizing beam splitter obviates the need for polarizers usually associated with a liquid crystal light valve.

Operation in a reflective mode enables the beam splitters to be used as beam combiners, thus reducing the number of components and the overall size and weight of the display.

The embodiments of FIGS. 4C, 5C, 6C and 7C, wherein the first polarity is orthogonal to the second polarity may be employed to provide a three-dimensional output.

A first light valve may be operative to modulate an image intended for a viewer's left eye, while a second light valve may be operative to modulate an image intended for a viewer's right eye, or vice versa.

The combined image projected via the objective lens appears on the screen as two mutually orthogonally polarized images. A viewer, wearing glasses having left and right lenses having mutually orthogonal polarization, sees an image in three dimensions, as if it were coming out of the screen.

In an alternative embodiment of the invention illustrated in FIGS. 4C, 5C, 6C and 7C time-interlaced stereo projection may be provided, the glasses may contain time-interlaced shutters for enabling different eyes of the viewer to see different images.

In a further alternative embodiment of the invention illustrated in FIGS. 4C, 5C, 6C and 7C, a first light valve may be operative to modulate a first spaced series of lines of an image, while a second light valve may be operative to modulate a second spaced series of lines of the image, interlaced with the first series of lines.

The combined image projected via the objective lens appears on the screen as a combined interlaced image. It is appreciated that the lines need not be horizontal as shown, but may instead be vertical or in any other suitable interlaced pattern. It is also appreciated that the above-described features may be readily combined to provide interlaced three-dimensional projection.

It will be appreciated by persons skilled in the art that the present invention is not limited by what has been particularly shown and described hereinabove. Rather the scope of the present invention include both combinations and sub-combinations of the various features described hereinabove as well as variations and modifications of such features as would occur to a person skilled in the art upon reading the description and which are not in the prior art.

What is claimed is:

1. A projector comprising:

a non-polarized light source;

at least one polarizing beam-splitter receiving light from said non-polarized light source, said polarizing beam splitter comprising first and second prisms separated by a liquid crystal material;

a selectably actuable polarization rotating light valve having impinging thereon light from the polarizing beam splitter and operating in a reflective mode; and a mirror having impinging thereon light from said polarizing beam splitter and reflecting said light via said polarizing beam splitter to said light source.

2. A projector according to claim 1 and wherein:

said at least one polarizing beam-splitter directs light of a first polarization to said selectably actuable polarization rotating light valve and directs light of a second polarization to said mirror;

said mirror reflects said light of said second polarization to said polarizing beam-splitter which directs it back to said light source; and said light source at least partially depolarizes said light of said second polarization.

3. A projector according to claim 1 and wherein said polarizing beam-splitter transmits light of a first polarization to said selectably actuable polarization rotating light valve and reflects light of a second polarization to said mirror and said polarizing beam-splitter reflects light from said mirror to said light source.

4. A projector according to claim 1 and wherein said polarizing beam-splitter reflects light of a first polarity to said selectably actuable polarization rotating light valve and transmits light of a second polarity to said mirror and said polarizing beam-splitter transmits light from said mirror to said light source.

5. A projector according to claim 2 and wherein said polarizing beam-splitter transmits light of a first polarization to said selectably actuable polarization rotating light valve and reflects light of a second polarization to said mirror and said polarizing beam-splitter reflects light from said mirror to said light source.

6. A projector according to claim 2 and wherein said polarizing beam-splitter reflects light of a first polarity to said selectably actuable polarization rotating light valve and transmits light of a second polarity to said mirror and said polarizing beam-splitter transmits light from said mirror to said light source.

7. A projector according to claim 1 and wherein said selectably actuable polarization rotating light valve comprises a total internal reflection color splitter/combiner associated with red, green and blue light valves.

8. A projector according to claim 1 and wherein said selectably actuable polarization rotating light valve comprises a color splitter/combiner associated with red, green and blue light valves.

9. A projector according to claim 2 and wherein said selectably actuable polarization rotating light valve comprises a total internal reflection color splitter/combiner associated with red, green and blue light valves.

10. A projector according to claim 2 and wherein said selectably actuable polarization rotating light valve comprises a color splitter/combiner associated with red, green and blue light valves.

11. A projector according to claim 3 and wherein said selectably actuable polarization rotating light valve comprises a total internal reflection color splitter/combiner associated with red, green and blue light valves.

12. A projector according to claim 3 and wherein said selectably actuable polarization rotating light valve comprises a color splitter/combiner associated with red, green and blue light valves.

13. A projector according to claim 4 and wherein said selectably actuable polarization rotating light valve comprises a total internal reflection color splitter/combiner associated with red, green and blue light valves.

14. A projector according to claim 4 and wherein said selectably actuable polarization rotating light valve comprises a color splitter/combiner associated with red, green and blue light valves.

15. A projector according to claim 5 and wherein said selectably actuable polarization rotating light valve comprises a total internal reflection color splitter/combiner associated with red, green and blue light valves.

16. A projector according to claim 5 and wherein said selectably actuable polarization rotating light valve comprises a color splitter/combiner associated with red, green and blue light valves.

17. A projector according to claim 6 and wherein said selectably actuable polarization rotating light valve comprises a total internal reflection color splitter/combiner associated with red, green and blue light valves.

18. A projector according to claim 6 and wherein said selectably actuable polarization rotating light valve comprises a color splitter/combiner associated with red, green and blue light valves.

19. A projector according to claim 1 and also comprising a color modulator associated with said light source.

20. A projector according to claim 3 and also comprising a color modulator associated with said light source.

21. A projector according to claim 4 and also comprising a color modulator associated with said light source.

* * * * *